(12) United States Patent
Engelbrecht et al.

(10) Patent No.: US 7,812,100 B2
(45) Date of Patent: Oct. 12, 2010

(54) ALKOXYAMINES CONTAINING UNSATURATED GROUPS

(75) Inventors: Lothar Alexander Engelbrecht, Heerenveen (NL); Peter Nesvadba, Marly (CH)

(73) Assignee: Ciba Corporation, Tarrytown, NY (US)

( * ) Notice: Subject to any disclaimer, the term of this patent is extended or adjusted under 35 U.S.C. 154(b) by 131 days.

(21) Appl. No.: 12/084,022

(22) PCT Filed: Oct. 16, 2006

(86) PCT No.: PCT/EP2006/067410

§ 371 (c)(1),
(2), (4) Date: Apr. 23, 2008

(87) PCT Pub. No.: WO2007/048719

PCT Pub. Date: May 3, 2007

(65) Prior Publication Data

US 2009/0198033 A1 Aug. 6, 2009

(30) Foreign Application Priority Data

Oct. 26, 2005 (EP) ................... 05110005

(51) Int. Cl.
*C08F 283/12* (2006.01)

(52) U.S. Cl. ................ 525/474; 525/479; 528/27; 528/31; 546/247; 546/248; 526/258

(58) Field of Classification Search ............... 528/21, 528/31, 27; 546/247, 248; 524/96, 110, 524/588, 548; 526/258; 525/474, 479
See application file for complete search history.

(56) References Cited

U.S. PATENT DOCUMENTS

| 6,831,130 B2 | 12/2004 | Fujita et al. ................. 525/101 |
| 6,936,670 B2 * | 8/2005 | Kramer et al. .............. 526/265 |
| 7,619,050 B2 * | 11/2009 | Nesvadba et al. ........... 526/204 |
| 2005/0065119 A1 * | 3/2005 | Couturier et al. ............ 514/114 |
| 2005/0288435 A1 * | 12/2005 | Pfaendner et al. ............. 525/71 |
| 2006/0160973 A1 * | 7/2006 | Harada et al. ............... 526/319 |

OTHER PUBLICATIONS

C. Wetter et al., Chem. Commun., (2004), pp. 174-175.

* cited by examiner

*Primary Examiner*—Milton I Cano
*Assistant Examiner*—Michael Leonard
(74) *Attorney, Agent, or Firm*—Shiela A. Loggins

(57) ABSTRACT

The invention relates to new alkoxyamines suitable for hydrosilylation reactions, to siloxane modified alkoxamines and to siloxane modified polymers as well as to their use. The alkoxamines are compounds of formula (I) or (II) wherein A is a group capable of forming a stable free nitroxyl radical A. which is bound via its oxygen atom to the carbon atom; $R_1$ and $R_2$ independently of one another are hydrogen, $C_1$-$C_{18}$alkyl, $C_3$-$C_8$cycloalkyl or phenyl which are unsubstituted or substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino; $R_3$, $R_4$ and $R_5$ independently of one another are hydrogen or $C_1$-$C_{18}$alkyl or phenyl; or $R_3$ and $R_5$ together with the linking group C=C form a 5 to 12 membered ring; $R_6$ is X hydrogen or $C_1$-$C_{18}$alkyl or phenyl; X is O, NH or $NR_7$, wherein $R_7$ is $C_1$-$C_{18}$alkyl, $C_3$-$C_8$cycloalkyl or phenyl; Y is a direct bond, $C_1$-$C_{30}$alkylene or $C_6$-$C_{12}$arylene.

10 Claims, No Drawings

ALKOXYAMINES CONTAINING UNSATURATED GROUPS

This application is a National Stage completion of PCT/EP2006/067410 filed Apr. 23, 2008, which claims priority from European Patent Application EP-05110005.5 filed Oct. 26, 2005.

The invention relates to new alkoxyamines suitable for hydrosilylation reactions, to siloxane modified alkoxamines and to siloxane modified polymers as well as to their use.

The International Publication WO2004/029156 (Ciba) describes a process for the preparation of a triblock-copolymer or graft-copolymer via controlled free radical polymerization using NOR functional polysiloxanes. A polysiloxane is reacted with an ethylenically unsaturated functional alkoxyamine of formula (I)

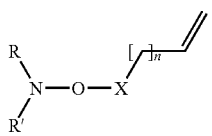
(I)

under hydrosilylation conditions. Polymers containing e.g. poly-styrol-polysiloxane-poly-styrol blocks are obtained.

Chem. Commun., 2004, 174-175 describes radical cyclization reactions using alkoxyamines as starting material. The alkoxamines disclosed therein are disclaimed.

It has been found that using specific alkoxyamines as hydrosilylation agent, siloxane modified alkoxamines having an improved activity in polymerising acrylates can be obtained.

One aspect of the invention is a compound of formula (I) or (II)

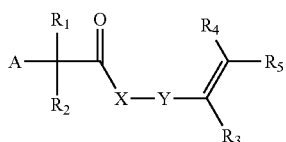
(I)

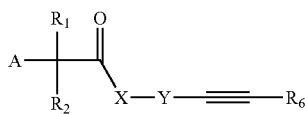
(II)

wherein

A is a group capable of forming a stable free nitroxyl radical A• which is bound via its oxygen atom to the carbon atom;

$R_1$ and $R_2$ independently of one another are hydrogen, $C_1$-$C_{18}$-alkyl, $C_3$-$C_8$cycloalkyl or phenyl which are unsubstituted or substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino;

$R_3$, $R_4$ and $R_5$ independently of one another are hydrogen or $C_1$-$C_{18}$alkyl or phenyl; or $R_3$ and $R_5$ together with the linking group C=C form a 5 to 12 membered ring;

$R_6$ is hydrogen or $C_1$-$C_{18}$alkyl or phenyl;

X is O, NH or $NR_7$, wherein $R_7$ is $C_1$-$C_{18}$alkyl, $C_3$-$C_8$cycloalkyl or phenyl;

Y is a direct bond, $C_1$-$C_{30}$alkylene or $C_6$-$C_{12}$arylene, with the proviso that the compound of formula I is not

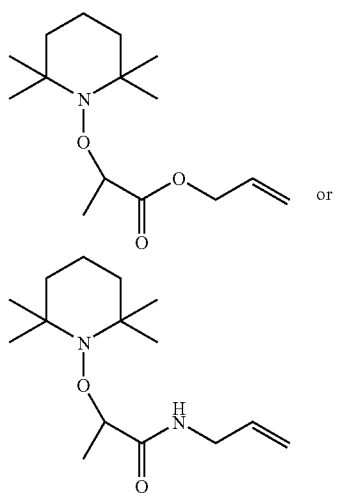

Another aspect of the invention is a polysiloxane modified initiator/regulator of the formula

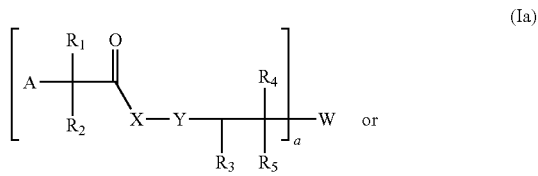
(Ia)

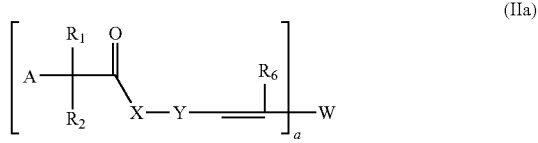
(IIa)

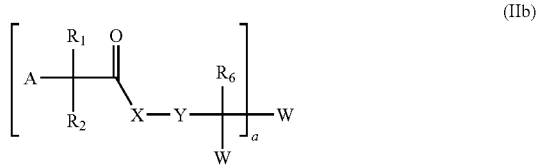
(IIb)

wherein

A, $R_1$, $R_2$, $R_3$, $R_4$, $R_5$, $R_6$, X and Y independently of one another are as defined above under formula (I) or (II) and a is 1 or 2, or a whole number between 1 and 100, W is a linear or branched monofunctional, difunctional or multifunctional polysiloxane residue.

Furthermore the invention relates to a siloxane modified polymer or copolymer which is obtained by a) reacting a Si—H functionalized polysiloxane in the presence of a functional alkoxyamine initiator/regulator compound of the formula (I) or (II) as defined above under hydrosilylation conditions to obtain alkoxyamine functional polysiloxanes (Ia), (IIa) or (IIb)

b) reacting the resulting alkoxyamine functional polysiloxane (Ia), (IIa) or (IIb) with at least one vinylic monomer at a temperature between 60 and 160° C.

Furthermore the invention relates to the use of a siloxane modified polymer or copolymer which is obtained as described above as slip and leveling agent or as dispersant.

Furthermore the invention relates to the use of a siloxane modified polymer or copolymer as slip and leveling agent or as dispersant, whereby the polymer or copolymer is obtained by a) reacting a Si—H functionalized polysiloxane in the presence of a functional alkoxyamine initiator/regulator compound of the formula (III), (IV), (V) or (VI)

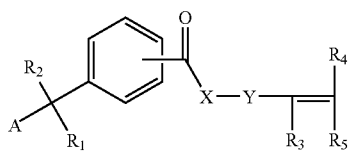
(III)

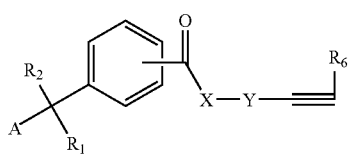
(IV)

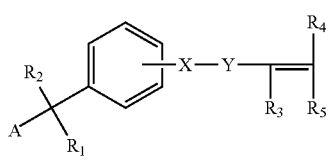
(V)

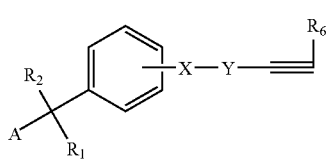
(VI)

under hydrosilylation conditions to obtain alkoxyamine functional polysiloxanes (IIIa), (IVa or IVb), (Va), (VIa or VIb)

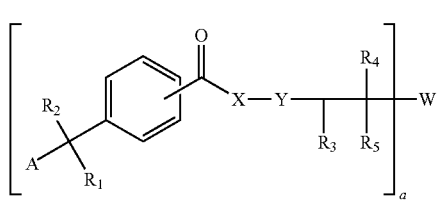
(IIIa)

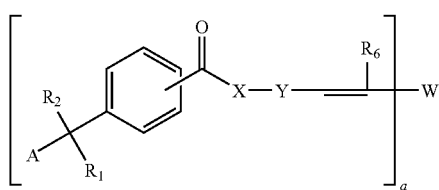
(IVa)

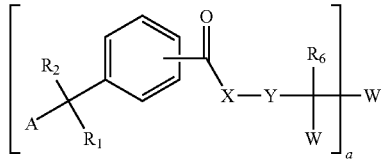
(IVb)

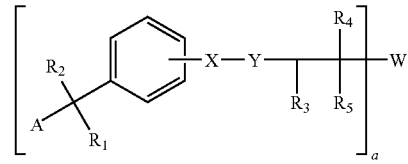
(Va)

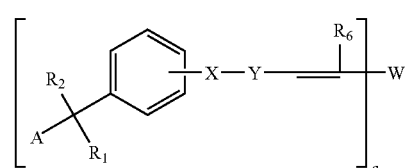
(VIa)

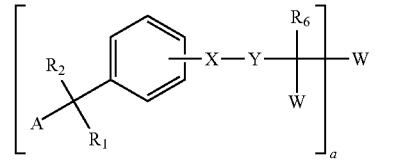
(VIb)

wherein A, $R_1$, $R_2$, $R_3$, $R_4$, $R_5$, $R_6$, X and Y, W, a are as defined above under formula (I)

c) reacting the resulting alkoxyamine functional polysiloxane with at least one vinylic monomer at a temperature between 60 and 160° C.

Preferences

Preferred is a compound of the formula I and a siloxane modified initiator of the formula Ia and a siloxane modified polymer or copolymer which is obtained by d) reacting a Si—H functionalized polysiloxane in the presence of a functional alkoxyamine initiator/regulator compound of the formula (I) under hydrosilylation conditions to obtain alkoxyamine functional polysiloxanes (Ia), e) reacting the resulting alkoxyamine functional polysiloxane with at least one vinylic monomer at a temperature between 60 and 160° C.

Vinylic Monomers

The vinylic monomer is selected from the group consisting of acrylic acid, methacrylic acid, acrylonitrile, methacrylonitrile, acrylic acid ($C_1$-$C_{22}$)alkyl esters, acrylic acid ($C_1$-$C_{22}$)-hydroxyalkyl esters, methacrylic acid ($C_1$-$C_{22}$)alkyl esters, methacrylic acid ($C_1$-$C_{22}$)hydroxy-alkyl esters, acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, —$SO_3H$, epoxy, fluoro, perfluoro or siloxane groups, styrene, substituted styrene, acrylamide and methacrylamide, N-mono($C_1$-$C_{22}$)alkyl acrylamide, N,N-di ($C_1$-$C_{22}$)alkyl acrylamide; provided that the amount of unsubstituted acrylic acid ($C_1$-$C_{22}$)alkyl esters or/and methacrylic acid ($C_1$-$C_{22}$)alkyl esters is more than 30% by weight based on the weight of the total monomer mixture.

Preferably the vinylic monomer is styrene, methylacrylate, ethylacrylate, n-butylacrylate, iso-butylacrylate, tert. butylacrylate, hydroxyethylacrylate, hydroxypropylacrylate, dimethyl-aminoethylacrylate, glycidylacrylates, methyl(meth)acrylate, ethyl(meth)acrylate, butyl(meth)-acrylate, hydroxyethyl(meth)acrylate, hydroxypropyl(meth)acrylate, dimethylaminoethyl-(meth)acrylate, glycidyl(meth)acrylates, acrylonitrile, acrylamide, methacrylamide or dimethylaminopropyl-methacrylamide or mixtures of them.

In a preferred embodiment the vinylic monomer is an acrylic monomer.

If the siloxane modified polymer is used as slip and leveling agent the especially preferred vinylic monomer is selected from methylacrylate, ethylacrylate, ethylhexylacrylate, propyl-acrylate, cyclohexylacrylate, hydroxyethylacrylate, n-butylacrylate, styrene, vinylpyridine.

If the siloxane modified polymer is used as dispersant the especially preferred vinylic monomer is an acrylic acid ($C_1$-$C_{22}$)alkyl esters or methacrylic acid ($C_1$-$C_{22}$)alkyl esters which are substituted by amino, ($C_1$-$C_{22}$)alkylamino, ($C_1$-$C_{22}$)dialkylamino, e.g. dimethylaminoethyl-(meth)acrylate.

In the context of this invention, the term "polymer" refers to a polymer of any type including homopolymers and copolymers. The term "copolymer" is meant to include polymers containing groups or units derived from two or more monomers with random, diblock, and multi-block microstructures. The copolymer can be block(co)polymers, comb (co)polymers, star(co)polymers, dendritic(co)polymers or hyperbranched(co)polymers. Block structures such as diblock, triblock are preferred.

In other words, after completing the polymerization of a first monomer to the extent desired to form a first polymer "block", a second monomer is introduced into the reaction mass to effect polymerization of the second monomer to form a second polymer "block" that is attached to the end of the first block. Using this sequential addition process, a broad range of diblock, triblock, etc. copolymers can be prepared.

The term "copolymer" also includes gradient copolymers or tapered copolymers which are copolymers composed for example of two monomers or monomer mixtures A and B in whose individual chains there is a gradient in the distribution of the monomer units along the chains. One end of the chain is rich in A units and the other in B units. Such copolymers show a continuous transition of one monomer or monomer mixture A into another monomer of monomer mixture B along the polymer chain.

Polysiloxanes

The Si—H functionalized polysiloxane is linear or branched and is commercially available or can be produced via known methods (Silicone, Chemie und Technologie [Silicones, Chemistry and Technology], Vulkan Publishers, Essen 1989, pp 82-84).

The Si—H functionalized polysiloxanes contains at least one unit corresponding to the general formula $H(R_2)_2SiO_{1/2}$ wherein R is $C_1$-$C_6$alkyl or phenyl, preferably methyl. The Si—H unit or Si—H units can be in alpha and/or omega position or can be distributed. Thus, the siloxanes are taken from the group consisting of linear siloxanes, comb-like siloxanes, T-branched siloxanes.

Preferred examples are:

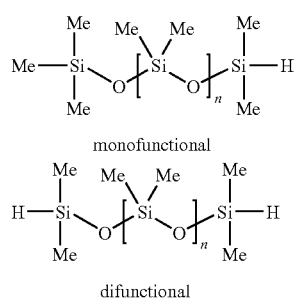

monofunctional difunctional

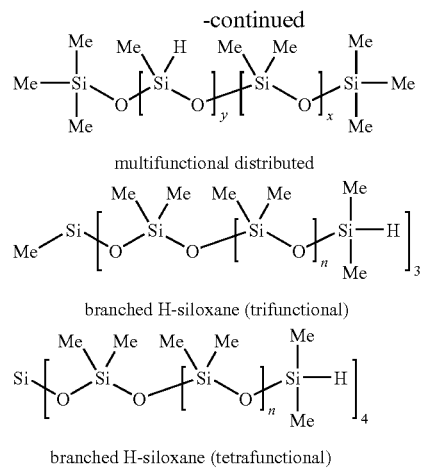

multifunctional distributed branched H-siloxane (trifunctional)

branched H-siloxane (tetrafunctional)

Me = methyl,
n = 1-200, x = 0-100, y = 1-100

DEFINITIONS $C_1$-$C_{28}$alkyl radicals are linear or branched and are, for example, methyl, ethyl and the various position isomers of propyl, butyl, pentyl, hexyl, heptyl, octyl, nonyl, decyl, undecyl, dodecyl, tridecyl, tetradecyl, pentadecyl or hexadecyl, heptadecyl, octadecyl, nonadecyl or eicosyl.

$C_3$-$C_8$cycloalkyl is, for example, cyclopropyl, dimethylcyclopropyl, cyclobutyl, cyclopentyl, methylcyclopentyl, cyclohexyl, cycloheptyl or cyclooctyl.

$C_1$-$C_{30}$alkylene bridges are linear or branched and may be interrupted by at least one N or O atom. Preferred are $C_1$-$C_{12}$alkylene bridges, more preferably of $C_2$-$C_6$alkylene bridges like ethylene, propylene, butylene, pentylene, hexylene.

$C_2$-$C_{12}$alkylene bridges interrupted by at least one N or O atom are, for example, —$CH_2$—O—$CH_2$—$CH_2$—, —$CH_2$—O—$CH_2$—$CH_2$—$CH_2$—, —$CH_2$—O—$CH_2$—$CH_2$—$CH_2$—$CH_2$—, —$CH_2$—O—$CH_2$—$CH_2$—O—$CH_2$—, —$CH_2$—NH—$CH_2$—$CH_2$—, —$CH_2$—NH—$CH_2$—$CH_2$—$CH_2$—, —$CH_2$—NH—$CH_2$—$CH_2$—$CH_2$—$CH_2$—, —$CH_2$—NH—$CH_2$—$CH_2$—NH—$CH_2$— or —$CH_2$—NH—$CH_2$—$CH_2$—O—$CH_2$—.

$C_6$-$C_{12}$arylene is, for example, o-, m- or p-phenylene, 1,4-naphthylene or 4,4'-diphenylene.

Preferably $R_1$ and $R_2$ are hydrogen or $C_1$-$C_4$alkyl, more preferably hydrogen or methyl.

Preferably $R_3$, $R_4$ and $R_5$ are hydrogen or $C_1$-$C_4$alkyl.

The radical A• derived from the group A can be a stable open chain nitroxyl radical or a cyclic nitroxyl radical.

Preferred is a stable cyclic nitroxyl radical.

Preferably the structural element

are part of a 5 to 7-membered heterocyclic ring, which optionally has an additional nitrogen or oxygen atom in the ring system. Substituted piperidine, morpholine and piperazine derivatives are particularly useful.

Preferably the structural element

is a structural element of formula (X)

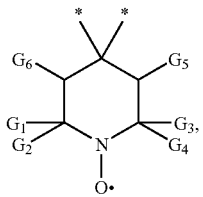

wherein $G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5$, $G_6$ independently are H, $C_1$-$C_{18}$alkyl, phenyl, naphthyl or a group $COOC_1$-$C_{18}$alkyl;

In particular the structural element of formula (X) is of formula A, B or O described below and thus a preferred compound of the formula (I) or (II); or (Ia), (IIa) or (IIb) is a compound wherein $R_1$ and $R_2$ independently of one another are hydrogen or $C_1$-$C_{18}$-alkyl, $R_3$, $R_4$ and $R_5$ independently of one another are hydrogen or $C_1$-$C_{18}$alkyl;

$R_6$ is hydrogen or $C_1$-$C_{18}$alkyl;

X is O, NH or $NR_7$, wherein $R_7$ is $C_1$-$C_{18}$alkyl,

Y is a direct bond or $C_1$-$C_{30}$alkylene

A is a residue of formula A, B or O,

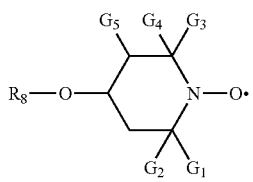
(A)

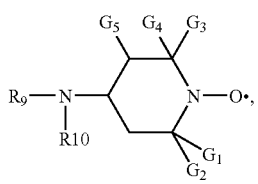
(B)

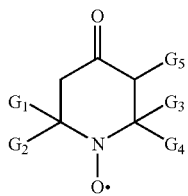
(O)

wherein $R_8$ is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_9$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$R_{10}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$G_1$ and $G_3$ are methyl and $G_2$ and $G_4$ are ethyl or propyl or $G_1$ and $G_2$ are methyl and $G_3$ and $G_4$ are ethyl or propyl;

$G_5$ is hydrogen or $C_1$-$C_4$alkyl.

Especially preferred is a compound of the formula (I) or (II) or of the formula (Ia), (IIa) or (IIb) wherein $R_1$ and $R_2$ independently of one another are hydrogen or $C_1$-$C_{18}$-alkyl, $R_3$, $R_4$ and $R_5$ is hydrogen, $R_6$ is hydrogen, X is O, Y is $C_1$-$C_{30}$alkylene A is a residue of formula O,

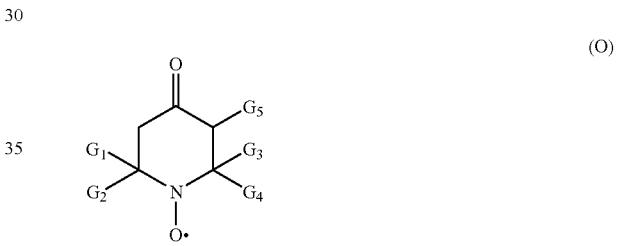
(O)

wherein $G_1$ and $G_3$ are methyl and $G_2$ and $G_4$ are ethyl or propyl or $G_1$ and $G_2$ are methyl and $G_3$ and $G_4$ are ethyl or propyl;

$G_5$ is hydrogen or $C_1$-$C_4$alkyl.

The above compounds and their preparation are described in GB 2 335 190 and GB 2 361 235 and in U.S. Pat. No. 6,353,107.

Another preferred structural element of formula (X) are those of formula (Xa), (Xb), (Xc), (Xd), (Xe) or (Xf)

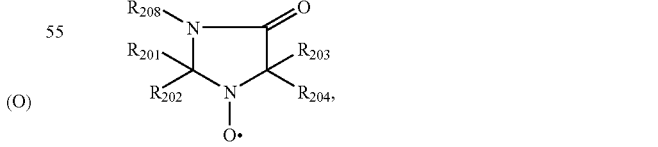
(Xa)

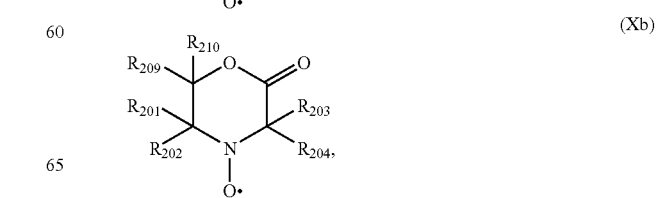
(Xb)

-continued

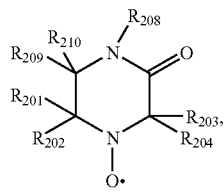
(Xc)

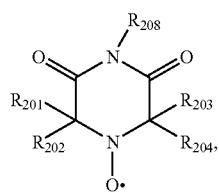
(Xd)

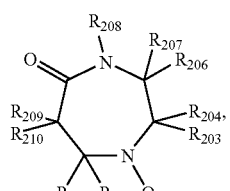
(Xe)

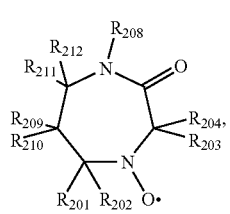
(Xf)

wherein $R_{201}$, $R_{202}$, $R_{203}$ and $R_{204}$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl or $R_{201}$ and $R_{202}$ and/or $R_{203}$ and $R_{204}$ together with the linking carbon atom form a $C_3$-$C_{12}$cycloalkyl radical;

$R_{205}$, $R_{206}$ and $R_{207}$ independently are hydrogen, $C_1$-$C_{18}$alkyl or $C_6$-$C_{10}$aryl;

$R_{208}$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_{205}$, $C_2$-$C_{18}$alkyl which is interrupted by at least one O atom and/or $NR_{205}$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl;

$R_{209}$, $R_{210}$, $R_{211}$ and $R_{212}$ are independently hydrogen, phenyl or $C_1$-$C_{18}$alkyl.

More preferably in formula (Xa), (Xb), (Xc), (Xd), (Xe) and (Xf) at least two of $R_{201}$, $R_{202}$, $R_{203}$ and $R_{204}$ are ethyl, propyl or butyl and the remaining are methyl; or $R_{201}$ and $R_{202}$ or $R_{203}$ and $R_{204}$ together with the linking carbon atom form a $C_5$-$C_6$cycloalkyl radical and one of the remaining substituents is ethyl, propyl or butyl.

The above compounds and their preparation are described in GB 2342649.

Further suitable compounds are the 4-imino compounds of formula (XI)

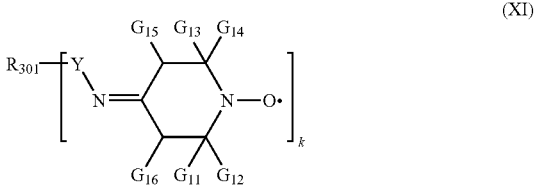
(XI)

wherein $G_{11}$, $G_{12}$, $G_{13}$ and $G_{14}$ are independently $C_1$-$C_4$alkyl or $G_{11}$ and $G_{12}$ together and $G_{13}$ and $G_{14}$ together, or $G_{11}$ and $G_{12}$ together or $G_{13}$ and $G_{14}$ together are pentamethylene;

$G_{15}$ and $G_{16}$ are each independently of the other hydrogen or $C_1$-$C_4$alkyl;

k is 1, 2, 3, or 4

Y is O, $NR_{302}$ or when n is 1 and $R_{301}$ represents alkyl or aryl Y is additionally a direct bond;

$R_{302}$ is H, $C_1$-$C_{18}$alkyl or phenyl;

if k is 1

$R_{301}$ is H, straight or branched $C_1$-$C_{18}$alkyl, $C_3$-$C_{18}$alkenyl or $C_3$-$C_{18}$alkinyl, which may be unsubstituted or substituted, by one or more OH, $C_1$-$C_8$alkoxy, carboxy, $C_1$-$C_8$alkoxycarbonyl;

$C_5$-$C_{12}$cycloalkyl or $C_5$-$C_{12}$cycloalkenyl;

phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl;

—C(O)—$C_1$-$C_{36}$alkyl, or an acyl moiety of a α,β-unsaturated carboxylic acid having 3 to 5 carbon atoms or of an aromatic carboxylic acid having 7 to 15 carbon atoms;

—$SO_3^-Q^+$, —$PO(O^-Q^+)_2$, —$P(O)(OR2)_2$, —$SO_2$—$R_2$, —CO—NH—$R_2$, —$CONH_2$, $COOR_2$, or $Si(Me)_3$, wherein $Q^+$ is $H^+$, ammonium or an alkali metal cation;

if k is 2

$R_{301}$ is $C_1$-$C_{18}$alkylene, $C_3$-$C_{18}$alkenylene or $C_3$-$C_{18}$alkynylene, which may be unsubstituted or substituted, by one or more OH, $C_1$-$C_8$alkoxy, carboxy, $C_1$-$C_8$alkoxycarbonyl;

or xylylene; or $R_{301}$ is a bisacyl radical of an aliphatic dicarboxylic acid having 2 to 36 carbon atoms, or a cycloaliphatic or aromatic dicarboxylic acid having 8-14 carbon atoms;

if k is 3, $R_{301}$ is a trivalent radical of an aliphatic, cycloaliphatic or aromatic tricarboxylic acid; and if k is 4, $R_{301}$ is a tetravalent radical of an aliphatic, cycloaliphatic or aromatic tetracarboxylic acid.

Preferably $G_{16}$ is hydrogen and $G_{15}$ is hydrogen or $C_1$-$C_4$alkyl, in particular methyl, and $G_{11}$ and $G_{13}$ are methyl and $G_{12}$ and $G_{14}$ are ethyl or propyl or $G_{11}$ and $G_{12}$ are methyl and $G_{13}$ and $G_{14}$ are ethyl or propyl.

The 4 imino compounds of formula (XI) can be prepared for example according to E. G. Rozantsev, A. V. Chudinov, V. D. Sholle.: Izv. Akad. Nauk. SSSR, Ser. Khim. (9), 2114 (1980), starting from the corresponding 4-oxonitroxide in a condensation reaction with hydroxylamine and subsequent reaction of the OH group. The compounds are described in WO 02/100831 (Ciba).

Concerning the nitroxyl radicals the alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl.

Preferred is alkenyl with 3 bis 12, particularly preferred with 3 to 6 carbon atoms.

Alkinyl with 3 to 18 is a linear or branched radical as for example propinyl (—CH$_2$—C≡CH), 2-butinyl, 3-butinyl, n-2-octinyl, or n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

$C_2$-$C_{18}$alkyl interrupted by at least one O atom is for example —CH$_2$—CH$_2$—O—CH$_2$—CH$_3$, —CH$_2$—CH$_2$—O—CH$_3$— or —CH$_2$—CH$_2$—O—CH$_2$—CH$_2$—CH$_2$—O—CH$_2$—CH$_3$—. It is preferably derived from polyethlene glycol. A general description is —((CH$_2$)$_a$—O)$_b$—H/CH$_3$, wherein a is a number from 1 to 6 and b is a number from 2 to 10.

$C_2$-$C_{18}$alkyl interrupted by at least one NR$_5$ group may be generally described as —((CH$_2$)$_a$— NR$_5$)$_b$—H/CH$_3$, wherein a, b and R$_5$ are as defined above.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$ aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$-$C_9$phenylalkyl is benzyl, phenylethyl or phenylpropyl.

$C_5$-$C_{10}$heteroaryl is for example pyrrol, pyrazol, imidazol, 2, 4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butyl-4-hydroxyphenyl)propionyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

Particularly suitable nitroxyl radicals are those of formulae

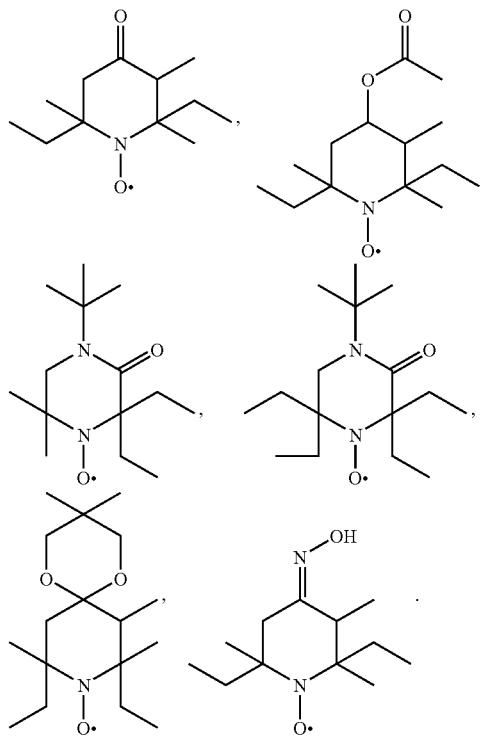

In a very specific embodiment the nitroxyl radical is

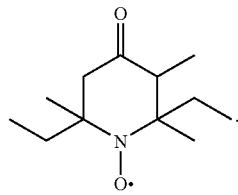

Preparation

1. Preparation of the Compounds of Formula I

The nitroxyl radicals which are the precursors of the group A of formula (I)-(VI) are known and may be prepared according to WO 99/03984, (Ciba) EP-A-0 891 986 (Ciba) or WO 98/13392 (Akzo).

The preparation of compounds of formula (I) or (II) can be performed by reacting nitroxyl radicals A* with the following carbon centered radicals:

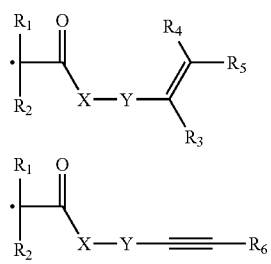

One, but not the only one, possibility is the reaction of the nitroxides A* with the following halogen derivatives transition metal such as for example Cu or Cu(I) salt, for example CuCl or CuBr, and optionally suitable ligand, for example 2,2' bipyridyl or pentamethyldiethylenetriamine. See K. Matyjaszewski, B. E. Woodworth, X. Zhang, Scott G. Gaynor, Z. Metzner.: Macromolecules 31, 5955-5957 (1998).

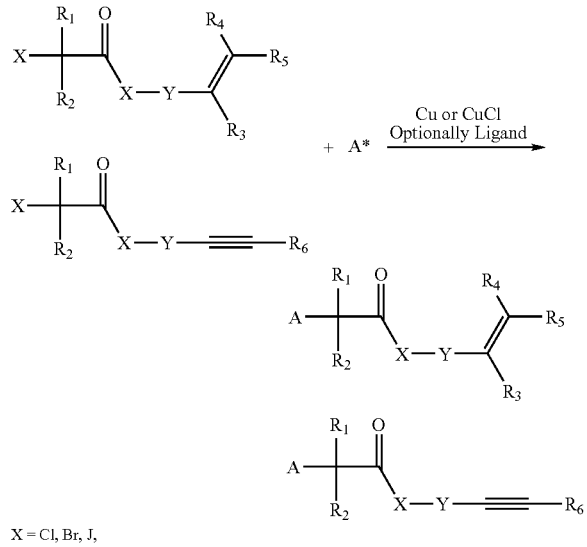

X = Cl, Br, J,

The above halogen derivatives can be easily prepared by well-known organic reactions, for example acylation of the corresponding alcohols or amines with suitable haloacid derivatives.

EXAMPLES

Example 1

Preparation of α,o-Poly-(n-butyl acrylate)-co-(polysiloxane) [A-B-A structure]

In a 100 ml three neck flask, equipped with thermometer, cooler and magnetic stirrer, 6.00 g (18.4 mmol) of regulator A*) [structure see below], 13.0 g (18.2 mmol) of an α,o-dihydrogen dimethylpolysiloxane [$M_n$ ~1428 g/mol; SiH=1.4 mmol/g] and 20 g of xylene are mixed and degassed twice. The clear solution obtained is heated under nitrogen to 90° C. At this temperature 20 mg of hexachloroplatinic acid solution [0.01 mmol Pt/g i-propanol] is injected. A slightly exothermic reaction is observed. The hydrosilylation is carried out to a residual SiH-value <0.02 mmol/g. Xylene is removed by distillation under reduced pressure. 50 g (390 mmol) of n-butyl acrylate is added. The mixture is degassed twice, heated to 130° C. and polymerization is carried out to a solid content of ~50%. The remaining volatiles (~44.5 g) are removed by distillation under vacuum.

44.5 g of a clear yellowish viscous fluid is obtained.
GPC: $M_n$=6018 g/mol; $M_w$=7798 g/mol PD=1.29
Regulator A*):

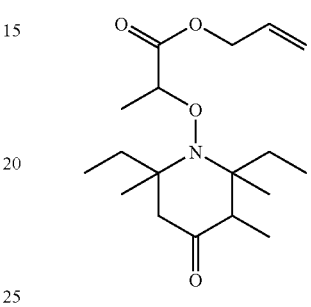

Example 2

Preparation of Poly-(n-butyl acrylate)-co-(polysiloxane) [Comb structure]

In a 100 ml three neck flask, equipped with thermometer, cooler and magnetic stirrer, 2.60 g (8.0 mmol) of regulator A*) [structure see above, 5.0 g (16.0 mmol) of a comb-like H-dimethylpolysiloxane [$M_n$ ~1500 g/mol; SiH=3.2 mmol/g] and 20 g of xylene are mixed and degassed twice. The clear solution obtained is heated under nitrogen to 80° C. At this temperature 20 mg of hexachloroplatinic acid solution [0.01 mmol Pt/g i-propanol] is injected. A slightly exothermic reaction is observed. The residual SiH content is reacted away by addition of octene. The hydrosilylation is carried out to a residual SiH-value <0.02 mmol/g. Xylene/octene is removed by distillation under reduced pressure.

80 g (624 mmol) of n-butyl acrylate is added. The mixture is degassed twice, heated to 130° C. and polymerization is carried out to a solid content of ~50%. The remaining volatiles (~45 g) are removed by distillation under vacuum.

44.5 g of a clear yellowish viscous fluid is obtained.
GPC: $M_n$=7775 g/mol; $M_w$=11042 g/molPD=1.42
Examples 3-10 were carried out in the same way described in Example 2.

| Example | Regulator A | H-Siloxane [SiH content (mmol/g)/ $M_n$ (g/mol)/structure] | Octene | GPC Product data [$M_n$/$M_w$/PD]* |
|---|---|---|---|---|
| 3 | 3.50 g | 5.00 g [3.2/1500/C*] | 2.00 g | 10181/20891/2.05 |
| 4 | 3.00 g | 3.00 g [3.15/635/L*] | 0.00 g | 9351/12910/1.38 |
| 5 | 3.00 g | 6.50 g [1.4/1428/L] | 0.00 g | 7775/11042/1.42 |
| 6 | 3.00 g | 4.95 g [1.84/1087/L] | 0.00 g | 7623/10198/1.34 |
| 7 | 2.52 g | 5.00 g [6.2/940/C] | 5.00 g | 12791/26494/2.07 |
| 8 | 2.27 g | 5.00 g [6.9/2050/C] | 6.00 g | 17359/38804/2.24 |
| 9 | 2.50 g | 3.60 g [3.2/1650/C] | 1.00 g | 8560/19906/2.33 |
| 10 | 3.00 g | 3.60 g [2.2/2700/C] | 1.00 g | 7361/22983/3.12 |

C*comb-like siloxanes (i.e. -[(Me)$_2$SiO]$_n$[MeSiHO]$_m$—)
L*α,o-dihydrogen siloxanes (i.e. HMe$_2$SiO[(Me)$_2$SiO]$_n$[Me$_2$SiH])
[$M_n$/$M_w$/PD]*mol weight distribution/polydispersity Application Results Anti Crater Performance
  A Anti Crater Performance in 2 Pack PU
  1) Formulation 2 Pack Polyurethane

TABLE 1

| 2 pack PU system/two component PU coating | (g) |
|---|---|
| 1) Synthalat A 150 (polyurethane available from Synthapol) | 88.6 |
| 2) Blue colorant (g) | 1.5 |
| 3) Butyl Acetate (g) | 11.3 |
| 4) EFKA-2018 (g) (defoamer) | 5.0 |
| Total | 100.0 |

The products 1 till 3 are shaken for 5 min in a skandex shaker.
After shaken, position number 4 is added and mixed in homogeneously.
2) Formulations for anti crater performance tests of the siloxane modified acrylic leveling agent:

TABLE 2

|  | 1 | 2 | 3 | 4 |
|---|---|---|---|---|
| 1) 2 pack PU (g) | 74.00 | 73.63 | 73.26 | 72.52 |
| 2) Example 1-20 (g) | 0.00 | 0.50 | 1.00 | 2.00 |
| 3) Desmodur N 75 (g) Polyisocyanate resin | 26.00 | 25.87 | 25.74 | 25.48 |
| Total | 100.00 | 100.00 | 100.00 | 100.00 |

Positions 1 to 3 are agitated homogeneously by spatula.
After mixing, let the samples rest for 1 hour before preparing the draw down.
3) Application
Draw downs are prepared using a 75 μm wire bar.
4) Results

TABLE 3

|  | Examples | | | |
|---|---|---|---|---|
|  | 1 0% | 2 0.5% | 3 1.0% | 4 2.0% |
| Comparative | 8 | 6 | 5 | 3 |
| 1 | 8 | 1 | 1 | 1 |
| 2 | 8 | 3 | 2 | 1 |
| 3 | 8 | 2 | 1 | 1 |
| 4 | 8 | 1 | 1 | 1 |
| 5 | 8 | 1 | 1 | 1 |
| 6 | 8 | 1 | 1 | 1 |
| 7 | 8 | 2 | 1 | 1 |
| 8 | 8 | 2 | 1 | 1 |
| 9 | 8 | 3 | 2 | 1 |
| 10 | 8 | 2 | 1 | 1 |

1 = no craters; 8 = a lot of craters.

B Slip Performance in Stoving Enamel
  1) Formulation Stoving Enamel:

TABLE 4

| Stoving enamel | (g) |
|---|---|
| 1) Vialkyd AC 451 | 71.4 |
| 2) Maprenal MF 650 | 19.5 |
| 3) Butyl Acetate | 10.1 |
| Total | 100.0 |

Positions 1 to 3 are agitated to a homogeneous mixture.
2) Formulations for Slip Performance Tests of the Siloxane Modified Acrylic Leveling Agent:

TABLE 5

|  | 0.5% | 1.0% |
|---|---|---|
| 1) Stoving enamel (g) | 99.50 | 99.00 |
| 2) Example 1-10 (g) | 0.50 | 1.00 |
| Total | 100.00 | 100.00 |

3) Preparation of the Draw Downs:
Draw downs of 75 μm are prepared on plastic films.
The draw downs have to rest for 10 minutes before curing.
Bake out time 30 min@135° C.
4) Results Coefficient of Friction:

TABLE 6

| Dynamic COF | comparative | Ex. 1 | Ex. 2 | Ex. 3 | Ex. 4 |
|---|---|---|---|---|---|
| 2) 0.5% | 0.33 | 0.19 | 0.24 | 0.26 | 0.21 |
| 3) 1.0% | 0.31 | 0.19 | 0.23 | 0.25 | 0.20 |

| Dynamic COF | Ex. 5 | Ex. 6 | Ex. 7 | Ex. 8 | Ex. 9 | Ex. 10 |
|---|---|---|---|---|---|---|
| 2) 0.5% | 0.24 | 0.26 | 0.23 | 0.24 | 0.29 | 0.25 |
| 3) 1.0% | 0.22 | 0.24 | 0.22 | 0.26 | 0.28 | 0.24 |

The invention claimed is:
1. A compound of formula (I) or (II)

$$\text{A}\begin{array}{c}R_1\\|\\-\text{C}-\\|\\R_2\end{array}\overset{O}{\overset{\|}{\text{C}}}-\text{X}-\text{Y}-\overset{R_4}{\underset{R_3}{\text{C}=\text{C}}}-R_5 \quad (I)$$

$$\text{A}\begin{array}{c}R_1\\|\\-\text{C}-\\|\\R_2\end{array}\overset{O}{\overset{\|}{\text{C}}}-\text{X}-\text{Y}-\!\!\equiv\!\!-R_6 \quad (II)$$

wherein
  A is a group of formula A, B or O capable of forming a stable free nitroxyl radical A• which is bound via its oxygen atom to the carbon atom (A)

$R_8-O-$ [piperidine ring with $G_5, G_4, G_3$ at top positions and $G_2, G_1$ at bottom, with N—O•]

(B)

$R_9-\underset{R_{10}}{N}-$ [piperidine ring with $G_5, G_4, G_3$ at top positions and $G_2, G_1$ at bottom, with N—O•], -continued

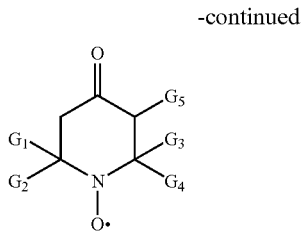
(O)

wherein $R_8$ is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_9$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$R_{10}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$G_1$ and $G_3$ are methyl and $G_2$ and $G_4$ are ethyl or propyl or $G_1$ and $G_2$ are methyl and $G_3$ and $G_4$ are ethyl or propyl;

$G_5$ is hydrogen or $C_1$-$C_4$alkyl, $R_1$ and $R_2$ independently of one another are hydrogen, $C_1$-$C_{18}$-alkyl, $C_3$-$C_8$cycloalkyl or phenyl which are unsubstituted or substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino;

$R_3$, $R_4$ and $R_5$ independently of one another are hydrogen or $C_1$-$C_{18}$alkyl or phenyl; or $R_3$ and $R_5$ together with the linking group C=C form a 5 to 12 membered ring;

$R_6$ is hydrogen or $C_1$-$C_{18}$alkyl or phenyl;

X is O, NH or $NR_7$, wherein $R_7$ is $C_1$-$C_{18}$alkyl, $C_3$-$C_8$cycloalkyl or phenyl;

Y is a direct bond, $C_1$-$C_{30}$alkylene or $C_6$-$C_{12}$arylene.

2. The compound of the formula (I) or (II) according to claim 1 wherein $R_1$ and $R_2$ independently of one another are hydrogen or $C_1$-$C_{18}$-alkyl, $R_3$, $R_4$ and $R_5$ independently of one another are hydrogen or $C_1$-$C_{18}$alkyl;

$R_6$ is hydrogen or $C_1$-$C_{18}$alkyl;

X is O, NH or $NR_7$, wherein $R_7$ is $C_1$-$C_{18}$alkyl,

Y is a direct bond or $C_1$-$C_{30}$alkylene.

3. The compound of the formula (I) or (II) according to claim 1 wherein $R_1$ and $R_2$ independently of one another are hydrogen or $C_1$-$C_{18}$-alkyl, $R_3$, $R_4$ and $R_5$ is hydrogen, $R_6$ is hydrogen, X is O, Y is $C_1$-$C_{30}$alkylene, A is a residue of formula O

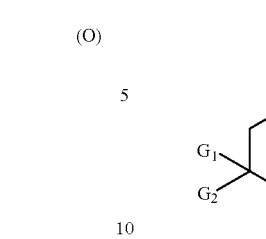
(O)

wherein $G_1$ and $G_3$ are methyl and $G_2$ and $G_4$ are ethyl or propyl or $G_1$ and $G_2$ are methyl and $G_3$ and $G_4$ are ethyl or propyl;

$G_5$ is hydrogen or $C_1$-$C_4$alkyl.

4. A polysiloxane modified initiator/regulator of the formula

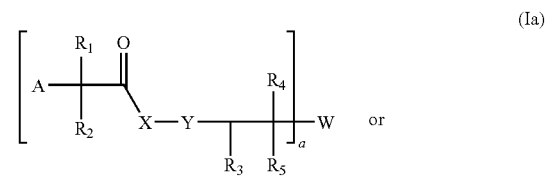
(Ia)

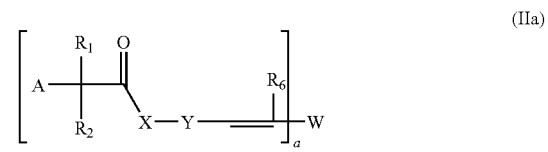
(IIa)

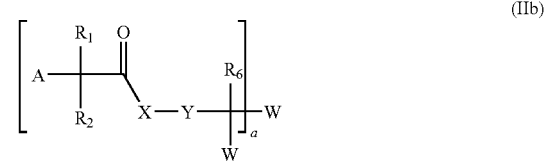
(IIb)

wherein

A is a group of formula A, B or O capable of forming a stable free nitroxyl radical A• which is bound via its oxygen atom to the carbon atom

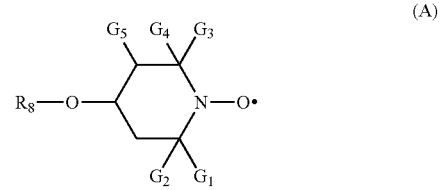
(A)

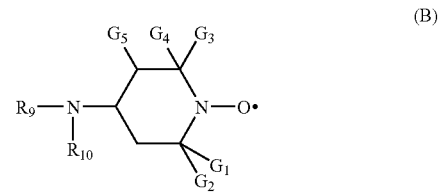
(B)

-continued

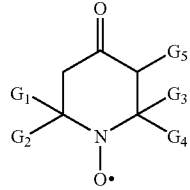
(O)

wherein
$R_8$ is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
$R_9$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl;
$R_{10}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
$G_1$ and $G_3$ are methyl and $G_2$ and $G_4$ are ethyl or propyl or $G_1$ and $G_2$ are methyl and $G_3$ and $G_4$ are ethyl or propyl;
$G_5$ is hydrogen or $C_1$-$C_4$alkyl,
$R_1$ and $R_2$ independently of one another are hydrogen, $C_1$-$C_{18}$-alkyl, $C_3$-$C_8$cycloalkyl or phenyl which are unsubstituted or substituted by NO$_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino;
$R_3$, $R_4$ and $R_5$ independently of one another are hydrogen or $C_1$-$C_{18}$alkyl or phenyl; or $R_3$ and $R_5$ together with the linking group C=C form a 5 to 12 membered ring;
$R_6$ is hydrogen or $C_1$-$C_{18}$alkyl or phenyl;
X is O, NH or NR$_7$, wherein R$_7$ is $C_1$-$C_{18}$alkyl, $C_3$-$C_8$cycloalkyl or phenyl;
Y is a direct bond, $C_1$-$C_{30}$alkylene or $C_6$-$C_{12}$arylene,
a is 1 or 2, or a whole number between 1 and 100,
W is a linear or branched monofunctional, difunctional or multifunctional polysiloxane residue.

5. The polysiloxane modified initiator/regulator according to claim 4, wherein W is derived from

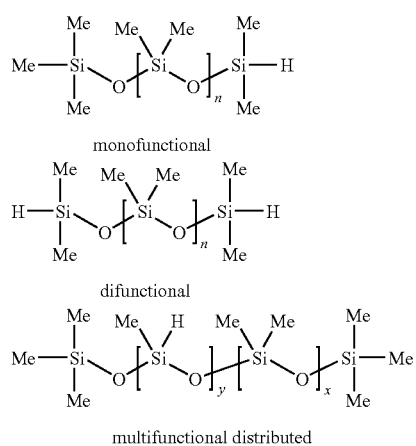

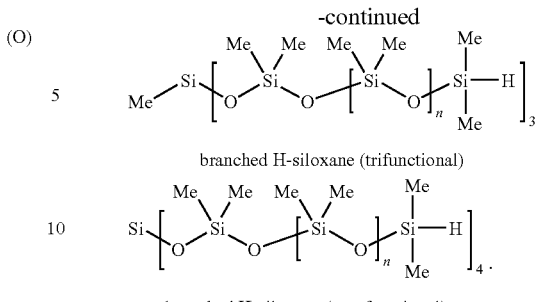

Me = methyl,
n = 1-200, x = 0-100, y = 1-100

6. The compound of the formula (Ia), (IIa) or (IIb) according to claim 4 wherein
$R_1$ and $R_2$ independently of one another are hydrogen or $C_1$-$C_{18}$-alkyl,
$R_3$, $R_4$ and $R_5$ independently of one another are hydrogen or $C_1$-$C_{18}$alkyl;
$R_6$ is hydrogen or $C_1$-$C_{18}$alkyl;
X is O, NH or NR$_7$, wherein R$_7$ is $C_1$-$C_{18}$alkyl,
Y is a direct bond or $C_1$-$C_{30}$alkylene.

7. The compound of the formula (Ia), (IIa) or (IIb) according to claim 4 wherein
$R_1$ and $R_2$ independently of one another are hydrogen or $C_1$-$C_{18}$-alkyl,
$R_3$, $R_4$ and $R_5$ is hydrogen,
$R_6$ is hydrogen,
X is O,
Y is $C_1$-$C_{30}$alkylene,
A is a residue of formula O

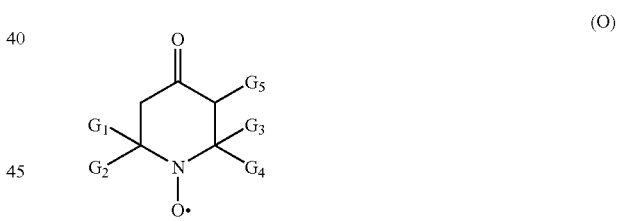
(O)

wherein
$G_1$ and $G_3$ are methyl and $G_2$ and $G_4$ are ethyl or propyl or $G_1$ and $G_2$ are methyl and $G_3$ and $G_4$ are ethyl or propyl;
$G_5$ is hydrogen or $C_1$-$C_4$alkyl.

8. A siloxane modified polymer or copolymer which is obtained by
a) reacting a Si-H functionalized polysiloxane in the presence of a functional alkoxyamine initiator/regulator compound of the formula (I) or (II)

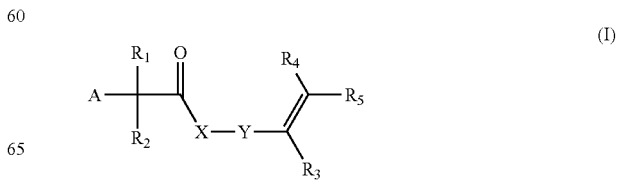
(I)

-continued

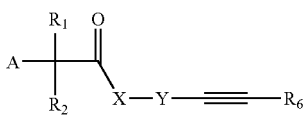
(II)

under hydrosilylation conditions to obtain alkoxyamine functional polysiloxanes (Ia), (IIa) or (IIb)

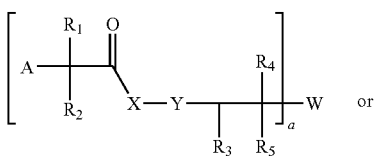
(Ia)

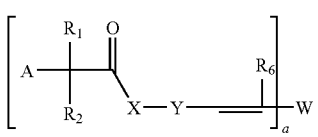
(IIa)

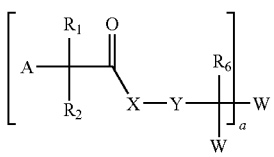
(IIb)

b) reacting the resulting alkoxyamine functional polysiloxane polysiloxanes (Ia), (IIa) or (IIb) with at least one vinylic monomer at a temperature between 60 and 160° C.

wherein

A is a group of formula A, B or O capable of forming a stable free nitroxyl radical A• which is bound via its oxygen atom to the carbon atom

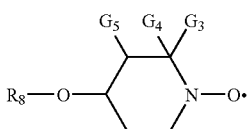
(A)

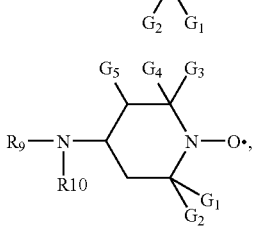
(B)

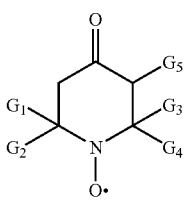
(O)

wherein $R_8$ is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_9$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$R_{10}$ is $C_1$-$C_{12}$alkyl, $C_5$-$C_7$cycloalkyl, $C_7$-$C_8$aralkyl, $C_2$-$C_{18}$alkanoyl $C_3$-$C_5$alkenoyl or benzoyl;

$G_1$ and $G_3$ are methyl and $G_2$ and $G_4$ are ethyl or propyl or $G_1$ and $G_2$ are methyl and $G_3$ and $G_4$ are ethyl or propyl;

$G_5$ hydrogen or $C_1$-$C_4$alkyl, $R_1$ and $R_2$ independently of one another are hydrogen, $C_1$-$C_{18}$-alkyl, $C_3$-$C_8$cycloalkyl or phenyl which are unsubstituted or substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino;

$R_3$, $R_4$ and $R_5$ independently of one another are hydrogen or $C_1$-$C_{18}$alkyl or phenyl; or $R_3$ and $R_5$ together with the linking group C=C form a 5 to 12 membered ring;

$R_6$ is hydrogen or $C_1$-$C_{18}$alkyl or phenyl;

X is O, NH or $NR_7$, wherein $R_7$ is $C_1$-$C_{18}$alkyl, $C_3$-$C_8$cycloalkyl or phenyl;

Y is a direct bond, $C_1$-$C_{30}$alkylene or $C_6$-$C_{12}$arylene, with the proviso that the compound of formula I is not

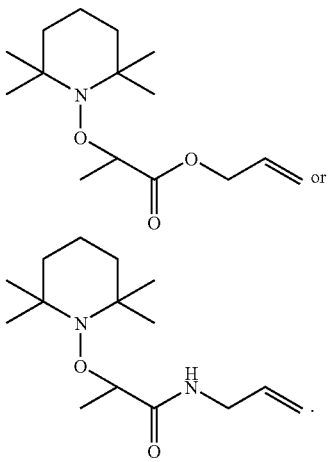

a is 1 or 2, or a whole number between 1 and 100,

W is a linear or branched monofunctional, difunctional or multifunctional polysiloxane residue.

9. A method for improving anti-crater performance or slip performance by mixing into a formulation a siloxane modified polymer or copolymer of claim 8 as slip and leveling agent or as dispersant.

10. A siloxane modified polymer or copolymer slip and leveling agent of claim 8 wherein the vinylic monomer is selected from methylacrylate, ethylacrylate, ethylhexylacrylate, propylacrylate, cyclohexylacrylate, hydroxyethylacrylate, n-butylacrylate, styrene, vinylpyridine.

* * * * *